United States Patent [19]

Harpell

[11] 4,070,418
[45] Jan. 24, 1978

[54] HEAT FORMABLE ELASTOMERIC BLOCK POLYMER PRODUCTS

[75] Inventor: Gary A. Harpell, North Tonawanda, N.Y.

[73] Assignee: The B. F. Goodrich Company, Akron, Ohio

[21] Appl. No.: 374,891

[22] Filed: June 29, 1973

Related U.S. Application Data

[62] Division of Ser. No. 191,118, Oct. 20, 1971, abandoned.

[51] Int. Cl.$^2$ .............................................. C08L 53/02
[52] U.S. Cl. .......................... 260/876 B; 260/880 B; 264/230; 264/237
[58] Field of Search ........................... 264/230, 237; 260/876 B, 5, 880 B

[56] References Cited

U.S. PATENT DOCUMENTS

| 3,139,468 | 6/1964 | Wheat | 264/230 |
|---|---|---|---|
| 3,417,177 | 12/1968 | Simons et al. | 264/230 |
| 3,420,363 | 1/1969 | Blickensderfer | 264/230 |
| 3,526,606 | 9/1970 | Minekawa et al. | 260/876 B |
| 3,526,683 | 9/1970 | Heslop et al. | 264/230 |
| 3,577,496 | 5/1971 | Hoffman | 264/230 |
| 3,597,372 | 8/1971 | Cook | 260/4 |
| 3,619,444 | 11/1971 | Roth | 264/230 |
| 3,619,455 | 11/1971 | Clement et al. | 264/230 |
| 3,646,161 | 2/1972 | Marwede et al. | 260/880 B |
| 3,674,733 | 7/1972 | Ayella | 264/230 |

Primary Examiner—Jeffery R. Thurlow
Attorney, Agent, or Firm—William A. Shira, Jr.; Harold S. Meyer

[57] ABSTRACT

Heat formable elastomer products are made by vulcanizing block polymers having a central block of thermoplastic and terminal blocks of vulcanizable elastomer, preferably after addition of separately prepared compatible vulcanizable elastomer. The products when heated, shaped, and cooled, will retain the new shape until reheated, but with altered physical properties. When reheated, they tend to return to their vulcanized condition of shape and physical properties.

4 Claims, No Drawings

HEAT FORMABLE ELASTOMERIC BLOCK POLYMER PRODUCTS

This is a division of application Ser. No. 191,118, filed Oct. 20, 1971, now abandoned.

BACKGROUND OF THE INVENTION

Thermoplastic elastomers have been prepared by block polymerization of a diene and styrene to produce polystyrenepolybutadiene-polystyrene or like copolymers which may be designated as S-B-S block polymers. These have the interesting property of being thermoplastic, so that they can be molded or otherwise shaped at a sufficiently high temperature, yet when cooled, will exhibit distinctly rubbery elastomeric properties.

Careful study of the S-B-S thermoplastic elastomers has indicated that when the blocks of the polymer are within a critical range of length, the polystyrene terminal portions of the molecular chains will cluster in domains, with the polydiene central portions extending in a random configuration between nearby polystyrene domains. Vulcanization is not required, since the connection of the ends of the polydiene portions or blocks to the polystyrene domains, plus entanglement of the chains, produces adequate physical cross-linkage.

When an article made from an S-B-S block polymer is heated to the melting temperature of the polystyrene terminal blocks, it can be reshaped and will retain its new shape indefinitely without exhibiting appreciable elastic memory.

For comparision, B-S-B type polymers have also been prepared, but have been described as weak, and have been of no apparent interest to previous workers.

SUMMARY OF THE INVENTION

I have found that excellent heat formable elastomer products can be prepared from B-S-B type polymers; that is, polybutadiene-polystyrene-polybutadiene block polymers, or from other block copolymers having terminal elastomer blocks on a central thermoplastic block, if certain procedures and precautions are observed.

The principal precaution is that the aggregate proportion of elastomer to thermoplastic be one which is conducive to formation of domains of a distinct phase of the thermoplastic polymer. This can be brought about either by producing a block copolymer having the proper proportions in the individual molecular chains, or by adding a compatible elastomer if the elastomeric terminal blocks are not as large as they should be for the kind of product involved.

The required procedure is that the B-S-B type block copolymer, together with added elastomer if desired, and with vulcanizing agents and other additives, such as pigments and the like, be shaped while hot and then be vulcanized in the desired shape.

Products so made have the characteristic properties of the elastomer component, with the thermoplastic component acting as though it were an inert filler. When heated to a temperature at which the thermoplastic component is moldable, the product can be deformed or reshaped, within the limits of its extensibility. After cooling in the new shape, it will retain that shape, with a modified modulus and extensibility, but when reheated, it will revert immediately to its vulcanized size and shape.

The vulcanization of the mixture not only cross-links the elastomeric constituent or block, but also ties the polystyrene domains into the elastomer matrix. Consequently, if the reshaping of the product at the higher temperature results in a pronounced change in dimensions, it will necessarily stretch not only the elastomer matrix but also the polystyrene in the domains. This has two consequences. One is that the elongated polystyrene domains, when cooled under stretch, will hold the entire composition in approximately the stretched size and shape. The other is that the amount of elasticity or extensibility of the reshaped product in the direction of its previous change in dimensions will generally be limited approximately to the portion of the original extensibility of the elastomer, the vulcanized polybutadiene, which has not already occurred and been frozen into the product.

Such a reshaped product will generally exhibit a pronounced anisotropy; that is, it will have a much higher modulus in one direction than in another. The extent to which this may be either desirable or undesirable will, consequently, have to be taken into account in the design of the product. If, for some reason, it is found that the finished product does not exhibit the most useful degree of extensibility or shape or dimension, it may be reheated, reshaped, and chilled to adjust its properties to those which will at that time be preferred. This may be done over and over if desired.

DETAILED DESCRIPTION

EXAMPLE 1

A block copolymer of butadiene-styrene-butadiene is prepared by polymerizing butadiene with a lithium catalyst to an average molecular weight of about 40,000, adding styrene until about half as much styrene is added to the polymer chain, and then coupling by elimination of the catalyst, to produce a material having a central polystyrene block of about 42,000 molecular weight constituting 35% of the material, with polybutadiene terminal blocks.

To 100 parts of this block copolymer is added 50 parts carbon black, 2 parts zinc oxide, 1 part stearic acid, 0.9 parts sulfur and 0.8 parts vulcanization accelerator. After heating to bring about vulcanization, and cooling, the product has a tensile strength of over 2,000 pounds per square inch and elongation at break of 350%.

The product is stretched to twice its original length at 120° C and cooled while stretched. The product retains more than half of the stretch when the tension is released, and then has an elongation at break of 175%. When reheated, it retracts to almost its original size and shape.

Similar results are obtained by sequential addition of monomers to obtain a B-S-B triblock copolymer instead of coupling B-S diblocks as described above.

EXAMPLE 2

A block copolymer is prepared in the same manner as in Example 1, except that the center polystyrene block has a molecular weight of about 96,000 and constitutes 80% of the copolymer with terminal blocks again of polybutadiene. This is blended with three times its weight of natural rubber composition containing the usual pigments and vulcanizing agents, such as carbon black, zinc oxide, stearic acid, sulfur, and vulcanization accelerator. The mixture is vulcanized by heating. It exhibits a tensile strength of about 3,000 pounds per square inch and ultimate elongation 460%.

The product is heated to 115° C and stretched to over three times its vulcanized length, and cooled while stretched. When the tension is released, the product retains 87% of its stretch. When reheated, it reverts to essentially its vulcanized size and shape.

EXAMPLE 3

When B-S-B polymers containing 80% polystyrene and having different molecular weights are compared by mixing them with three times their weights of vulcanizable rubber, vulcanizing, stretching to five times vulcanized length at 120° C and cooling while stretched, it is found that best results in retention of stretch after cooling are obtained with highest molecular weights up to 300,000 or more for the polystyrene center block. This indicates that maximum rigidity of the polystyrene domains is required for best retention of stretch. Accordingly, molecular weights of polystyrene blocks are desirably at least 40,000 and preferably at least 100,000.

EXAMPLE 4

Comparison of B-S-B polymers containing different proportions of styrene, by mixing them with three times their weight of vulcanizable rubber, vulcanizing, stretching to five times vulcanized length at 120° and cooling while stretched shows that the quantity of polystyrene in the final composition is important. Thus a B-S-B polymer containing 65% polystyrene, corresponding to about 16% polystyrene in the composition, retracts from a stretched length of five times original length to somewhat over twice original length. An 80% polymer, corresponding to 20% polystyrene in the composition, is capable of retaining well over three times original length; and a 95% polymer, corresponding to nearly 24% polystyrene in the composition, retains as much as four times original length when released from a five times length hot stretch. It is evident that the total proportion of polystyrene must be sufficient so that the elongated polystyrene domains will be close enough together to restrain the retraction of the stretched vulcanized rubber matrix of the product.

EXAMPLE 5

A block copolymer is prepared for isoprene and styrene by sequential addition of isoprene, then styrene, and finally more isoprene to the catalyst-containing medium to produce a material consisting of a polystyrene central block amounting to 80% of the polymer with the remainder being polyisoprene terminal blocks. This is mixed with three times its weight of vulcanizable natural rubber composition and vulcanized. When stretched hot to five times original length and cooled, three fourths of the stretch is retained. This is substantially more than when a similarly prepared polybutadiene-polystyrene-polybutadiene polymer is tested in the same manner.

EXAMPLE 6

A block copolymer is prepared as in Example 5, except that butadiene is substituted for isoprene, and that the polystyrene central block amounts to 95% of the polymer. When mixed with three times its weight of vulcanizable rubber and vulcanized, then stretched hot to five times original length and cooled, four-fifths of the stretch is retained.

EXAMPLE 7

The composition described in Example 2 is extruded in tubular shape and vulcanized. The tube is heated, inflated to twice its diameter, and cooled. The expanded tube is slipped over a cylindrical object having a diameter slightly less than the base of the expanded tube, and reheated, whereupon the tube shrinks to embrace snugly the cylinder.

EXAMPLE 8

The composition described in Example 2 is extruded in tubular shape and vulcanized. The tube is heated, stretched longitudinally to three times its length, which causes its diameter to reduce to somewhat over half its original dimension. The constricted tube is slipped into a pipe having a bore slightly larger than the outside diameter of the tube, and about half as long as the tube. The pipe is slowly rotated and is heated, beginning at the center of its length with the heated zone progressing slowly toward both ends. The heated portion of the tube expands radially to engage the inside of the pipe as a lining for the pipe, at the same time shortening progressively so that portions of the tube originally projecting from the ends are drawn into the bore of the pipe.

The foregoing Examples are typical of results which can be accomplished by vulcanization of any block copolymers of the general type indicated above, either along or when mixed before vulcanization with added quantities of vulcanizable elastomer.

The thermoplastic central block of the block polymer may be made from any monomer whose polymer has a convenient temperature range of thermoplasticity and which can be polymerized in sequence with a monomer capable of forming a vulcanizable elastomer, or grafted to an elastomer molecule. Thus, instead of polystyrene as the central polymer block, thermoplastic central polymer blocks may be made from such materials as alpha-methyl styrene, p-tert-butyl styrene, p-chlorostyrene, vinyl naphthalene, acenaphthylene, acrylonitrile, methyl methacrylate, ethylene, propylene, ethylene oxide, polyesters such as polyethylene terephthalate, polyamides such as the nearly rigid varieties of nylon, and the like.

The elastomeric terminal blocks similarly can be made from any monomer whose polymer is a true elastomer and is easily vulcanizable. Thus, instead of polybutadiene or polyisoprene as the terminal polymer blocks, the elastomeric terminal blocks may be made from such materials as piperylene, chlorobutadiene, mixtures of ethylene and propylene with a diene (EPDM rubbers), propylene oxide or epichlorohydrin, tetrahydrofurane, elastomer-forming esters such as butyl acrylate with a monomer conferring vulcanizability such as acrylic acid, elastomeric polyamides, silicone rubbers, and the like.

It is sometimes desirable to modify one or both of the polymer blocks. For example, if styrene and butadiene are chosen as the primary monomers, the thermoplastic central block can be modified by copolymerization of the styrene with a small proportion of butadiene to reduce its rigidity and brittleness, or the elastomeric terminal blocks can be modified by copolymerization of the butadiene with a small proportion of styrene to improve its strength and toughness, as long as the essential nature of the polymer blocks is retained, the central block being essentially inextensible at room temperature and thermoplastic, and the terminal blocks being essentially elastomeric at room temperature and vulcanizable.

The vulcanizing agents used in each instance will be those known to be suitable for the particular kind of elastomer which is present, including sulfur with the usual vulcanization accelerators, or peroxides, or metal oxides, depending on the choice of elastomeric material.

The temperature at which the products of this invention can be reshaped, and then set in their new shape by cooling, will depend primarily on the chemical nature of the thermoplastic center block of the block copolymer, but to some extent also on its molecular weight. In addition, molecular weight will influence the formation of domains and the extensibility of the product, as well as the retention of deformation after cooling, as was explained above.

Molecular weight of the polystyrene block (or in general, the central block if other thermoplastics are chosen) should not be much under 20,000, and is preferably 100,000 or more. It can be as high as several hundred thousand without adverse effect from high viscosity at mixing and forming temperatures.

For block polymers intended to be used without added elastomer, the volume occupied by the elastomer terminal blocks should be at least as great as that of the thermoplastic central block, and preferably should be substantially greater, up to several times the volume of the central block. If no heavy atoms are present, the volumes will be very nearly proportional to molecular weights, and the same relationship will apply to molecular weights, that the weight of the elastomer should exceed that of the thermoplastic and may be several times as great.

The same relationship will also apply when separate elastomer is added to the block copolymer — the aggregate quantity of elastomer should be greater than that of the thermoplastic block, and preferably substantially greater, up to several times as great as the thermoplastic.

If additional elastomer is used, above that in the block polymer, the elastomers should be compatible, in being vulcanizable under the same conditions and being capable of bonding to one another during vulcanization, as will be understood.

I claim:

1. An elastomeric article consisting of a vulcanized composition comprising a block copolymer having a central thermoplastic block of molecular weight from about twenty thousand to several hundred thousand and terminal blocks of vulcanizable elastomer, the ratio of the quantity of thermoplastic in the central block to the quantity of elastomer in the terminal block along with such additional vulcanizable elastomer as may be present being from about 1:1 to about 1:5, and which article has a definite size and shape and which when heated beyond a moldable temperature of the thermoplastic block without mechanical restraint will shrink in at least one direction to assume a different shape.

2. An article as in claim 1 in which the aggregate quantity of elastomer is at least about twice as great as that of thermoplastic.

3. An article as in claim 2 in which the elastomer in the block copolymer is a fraction of the aggregate quantity of elastomer.

4. An article as in claim 2 in which the elastomer is essentially all in the block copolymer.

* * * * *

UNITED STATES PATENT AND TRADEMARK OFFICE
CERTIFICATE OF CORRECTION

PATENT NO. : 4,070,418
DATED : January 24, 1978
INVENTOR(S) : Gary A. Harpell

It is certified that error appears in the above-identified patent and that said Letters Patent are hereby corrected as shown below:

Column 4, Line 30, "along" should be ----- "alone"---.

Column 6, Line 19, "block" should be ----- "blocks"-----.

Signed and Sealed this

Sixth Day of June 1978

[SEAL]

Attest:

RUTH C. MASON
*Attesting Officer*

DONALD W. BANNER
*Commissioner of Patents and Trademarks*